Jan. 8, 1935.  K. J. STRIGL  1,987,273
VEHICLE TRANSMISSION RETARDING MECHANISM
Filed July 7, 1931
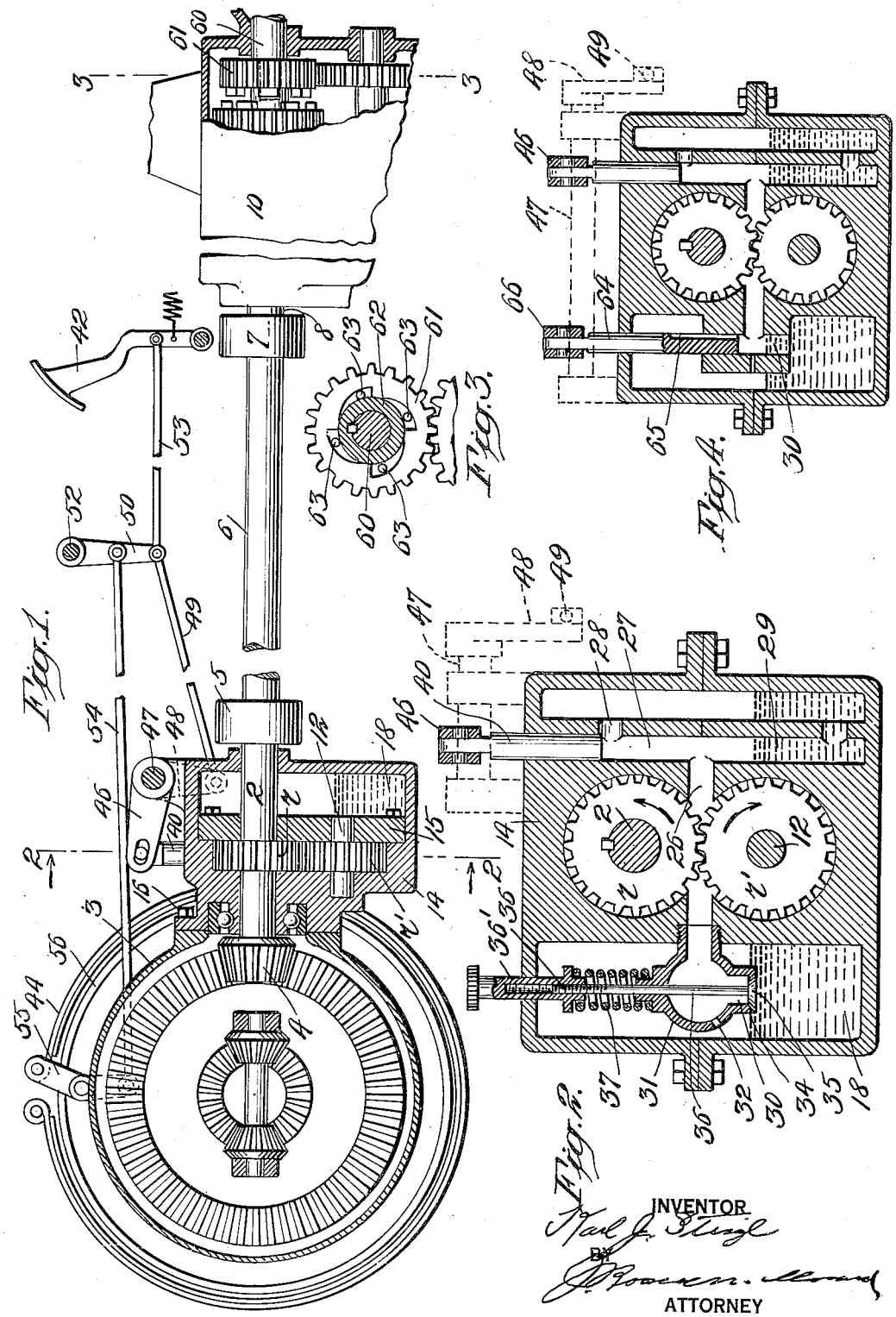

Patented Jan. 8, 1935

1,987,273

UNITED STATES PATENT OFFICE 1,987,273

VEHICLE TRANSMISSION RETARDING MECHANISM

Karl Josef Strigl, New York, N. Y.

Application July 7, 1931, Serial No. 549,199

5 Claims. (Cl. 188—92)

This invention relates to retarding or braking means for vehicles, particularly adapted for automobiles, and consists of an improved device designed to provide a readily controlled and direct hydraulic retarding action through the power transmission connections to give retarding control of the car independent of and supplemental to the action of the usual wheel brakes.

My improved hydraulic acting retarding means is further adapted for particularly advantageous use in conjunction with automobile transmissions having free wheel driving clutch devices in that it provides, in the braking action, for effective and safe retarding of the vehicle in advance of and conjointly with the action of the usual frictional wheel brakes, without danger of locking of the wheels and accordingly avoiding the resulting danger to skid.

In its preferred form, my present invention consists in an adaptation of a rotary or gear pump rotatably connected to the wheel driving connections or gearing of the car with valve means for controlling the passage of the fluid to produce a retarding effect upon the shaft or gearing to which it is connected, thereby to retard the movement of the vehicle. The controlling valve thereof may desirably be connected to be actuated by the movement of the brake pedal of the customarily employed frictional wheel brakes so that the hydraulic acting retard shall occur in advance of the setting of the wheel brakes and to operate conjointly therewith so that a positive and progressively acting retard of the wheel rotations is insured without danger of sudden wheel locking. My improved device is further designed to operate under normal, non-retard condition with a minimum of resistance to rotation of its rotors thereby to offer negligible resistance to the power transmission. A further desirable feature thereof consists in provision for adjustably and automatically controlling the passage of the fluid for retarding action to give a predetermined breaking effect or retard which may be to the degree to give effective retarding without excessive action and in consequence avoiding tendency to skid.

The foregoing and other features and advantages of my improved retarding means will be more fully understood by reference to the accompanying drawing wherein like reference characters are applied to the corresponding parts in the several views.

In the drawing:

Fig. 1 is a vertical, longitudinal, sectional view of my improved retarding device applied to an automobile transmission or driving arrangement of conventional form.

Fig. 2 is a vertical, transverse, sectional view of my improved hydraulic acting retarding means, taken on line 2—2 of Fig. 1.

Fig. 3 is a detail sectional view of the free wheel clutch taken on line 3—3 of Fig. 1 and Fig. 4 is a view similar to Fig. 2 showing a desirable modification wherein each of the valves is connected for direct manual operation.

The improved rotary fluid retarding device of the present invention is generally similar to a rotary or gear fluid pump and comprises the usual upper and lower rotors or gears $r$ and $r'$; the upper rotor being keyed or rotatably connected to a power transmission shaft 2, which as illustrated, is the wheel driving shaft associated with the differential casing 3 of an automobile and having on its rearward end the differential driving gear 4 and at its forward end connected by a universal joint 5 to the shaft 6 connected by universal joint 7 to the driven shaft 8 of the transmission or gear shift mechanism 10 in the customary arrangement. The lower rotor gear $r'$, as shown, is journalled on a countershaft 12 carried by the rotor casing members 14—15. The rotor casing member 14 is as shown formed with recesses closely embracing the rotor gears with provision for the meshing of the rotor gear teeth and is further formed with channels for the passage of the fluid impelled by the rotors. The casing members 14—15 are bolted together and the casing 14 is secured to the differential casing by bolts 16. This bearing casing 14 also forms a reservoir 18 for a fluid supply which desirably may be glycerin or suitable oil of non-freeze characteristics.

The channels formed in the rotor casing consist of a centrally positioned, horizontal channel 26 closed by the meshing gear teeth and communicating therewith is a valve channel or bore 27 and air intake 28 positioned to be closed by the valve; a downwardly extended oil intake channel 29 and, at the opposite side of the gears, a discharge channel 30 formed in a valve member 31 also provided with a bleeder opening 32. At the lower end of the discharge channel 30 there is formed a valve seat 34 normally closed by a valve 35 on valve stem 36. The stem 36 is vertically slidable in a bearing in the valve member and extends upwardly therefrom and is formed with threads to receive an adjusting nut 36' forming an upper bearing for compression spring 37 bearing at its lower end upon the valve member and operative to close the valve under spring

pressure. The nut member 36' is desirably extended upwardly through the supporting casing to permit of manual adjustment from the outside, as shown.

The air valve channel 27 has a slide valve 40 fitted thereto and operating vertically to close the air intake 28. This valve 40 is manually controlled and in accordance with the present invention is controlled by the action of the brake pedal 42 employed to actuate the usual frictional wheel brakes 44. To this end, the valve 40 is pivotally connected with an arm 46 on rock shaft 47 journalled on the supporting casing and provided with an arm 48 connected by rod 49 to an arm 50 on the brake rock shaft 52. The latter, in customary manner, is connected by rod 53 to the pivotally supported brake pedal 42 and is likewise connected by brake connecting rods 54 to the actuating levers 55 pivoted to the usual wheel brake bands 44 acting on the usual wheel drums 56. In further accordance with the present invention the actuating connections to the valve 40 are arranged to effect the closing of the air intake channel or opening prior to the setting of the wheel brakes; this being accomplished by the arrangement of the port 28 and valve 40 whereby the latter will operate to close the port during the initial period of movement of the brake pedal, the arrangement as shown providing for fully closing of the port 28 within the period of the first half of the forward movement of the brake pedal so as to normally brake by the fluid braking means in advance of the action of the frictional wheel brakes.

In the operation of the device as described, under normal forward driving condition, the rotors will be rotated in the directions as indicated by arrows in Fig. 2, the air intake 28 will be open and the discharge valve 35 closed. The rotors will then rotate freely with discharge of air through the bleeder port 32 and without pumping of the oil which is of a depth to be below the air openings. Upon depressing of the brake pedal, the valve slide 40 will be depressed to close the air intake 28 which causes the gear pump to produce suction to take in oil through passage 29, the oil passing circumferentially of the gears to the discharge passage 30 where its passage is checked by the spring valve 35 resulting in retarding of the gear rotation to the degree determined by the adjustment of the spring pressure. As will be appreciated, this retarding or resistance to rotation is communicated to the wheels with a braking effect to retard the speed of the vehicle preliminary to the action of the usual wheel brakes 44 and will likewise operate conjointly with the latter on further depression of the brake pedal. The provision of the air intake and bleeder opening 32 allows of normal idle rotation of the rotors with no braking effect and the latter provides a desirable restricted relief or discharge during the braking action to prevent locking of the wheels by the hydraulic control and to prevent stalling of the motor.

My improved hydraulic action braking means is particularly adapted for advantageous use in motor car driving connections employing free wheel driving provision in that it produces an initial or supplemental, powerful braking action effective upon normal operation of the brake pedal thereby adding to the safety factor and likewise materially reducing the use and wear of the frictional wheel brakes and thus avoiding the enhanced use of the latter incident to the customary free wheel operation.

With my improved supplemental retarding means, the transmission may safely employ a simple free wheeling clutch in constant operation, as here shown, the standard gear shift mechanism 10 being employed, with a simple roller clutch arranged to act between the usual clutch driven shaft 60 and the usual combined drive gear and direct drive clutch member 61 of the gear shift mechanism. As shown in Fig. 3, the drive shaft 60 has keyed thereon a bearing ring 62, engaged by rollers 63 fitted within internal inclined notches in the member 61 of a form to grip in the driving direction of rotation and to allow free wheeling when the driven members rotate in advance of the shaft 60.

While I have shown and described an approved embodiment of my invention, it will be understood that various modifications may be made therein without departing from the scope of the invention as defined in the appended claims.

As illustrative thereof, I have shown in Fig. 4 a modified form wherein the discharge valve of the hydraulic acting retard is manually controlled instead of the spring or automatic control as first illustrated. In this modified form, the discharge channel 30 is closed by a slide valve plunger 64 formed with a restricted relief slot 65 and pivotally connected at its upper end to a second arm 66 fixed on the rock shaft 47 and corresponding to the operating connection to the air valve 40 described. This arrangement provides for checking the rotor discharge under the direct influence of the brake pedal. As will be readily understood, this valve 64 is connected to effect the closing of the discharge likewise in advance of the setting of the wheel brakes so as to relieve the latter from the major braking action.

Having described my invention, I claim:

1. A retarding means of the character described comprising a driven shaft, a rotary fluid pump consisting of a casing for rotor members and forming an oil reservoir, rotor members journalled to rotate within the casing in meshing engagement and rotatably connected to the shaft to be driven thereby, said casing being formed with intake and discharge channels, an oil intake connecting the intake channel with the oil reservoir and an air intake to the intake channel from above the oil supply, manually operable valve means adapted to close the air intake to cause pumping of the oil, valve means adapted to check the fluid flow from the discharge channel said valve means having a bleeder opening from the discharge channel for the passage of air under idling operation.

2. A retarding means of the character described comprising a driven shaft, a rotary fluid pump consisting of a casing for rotor members and forming an oil reservoir, rotor members journalled to rotate within the casing in meshing engagement and rotatably connected to the shaft to be driven thereby, said casing being formed with intake and discharge channels, an oil intake connecting the intake channel with the oil reservoir bottom portion and an air intake to the intake channel from above the oil supply, manually operable valve means to close the air intake, an adjustable spring pressed valve positioned to close the discharge channel and a bleeder opening associated with the discharge channel for the passage of air under idling operation.

3. Transmission controlling mechanism of the character described, having in combination with a wheel driving shaft, a rotary fluid pump rotatably connected to the shaft, a fluid control valve, frictional wheel brakes, manually operable connections for actuating the brakes and connections from said brake actuating connections to the fluid control valve adapted to effect closing of the valve during the initial movement of the brake actuating connections for retarding of the shaft by the pump action in advance of the setting of the wheel brakes.

4. Transmission controlling mechanism of the character described having in combination with a wheel driving shaft, a rotary fluid pump rotatably connected to the shaft and having a bleeder opening providing a limit to the retard action of the pump, a fluid control valve, frictional wheel brakes, manually operable connections for actuating the brakes and connections from said brake actuating connections to the fluid control valve adapted to effect closing of the valve during the initial movement of the brake actuating connections for retarding of the shaft by the pump action in advance of the setting of the wheel brakes.

5. Transmission controlling mechanism of the character described having in combination with a wheel driving shaft, a rotary fluid pump rotatably connected to the shaft, a fluid control valve, frictional wheel brakes, manually operable means for actuating the brakes, a rock-shaft suitably journalled, connections from the manually operable means to the rock-shaft, connections from the rock-shaft to the brakes and connections from the rock-shaft to the control valve adapted to effect closing of the valve during the initial movement of the manually operable means to effect retarding of the shaft by the pump action in advance of the setting of the wheel brakes.

KARL JOSEF STRIGL.